J. E. HOY AND R. P. PLACE.
DIRT PROOF BEARING.
APPLICATION FILED MAR. 7, 1918. RENEWED MAY 16, 1919.

1,314,748.

Patented Sept. 2, 1919.

Inventor
John E. Hoy and
Roland P. Place

By Pagelsen & Spencer
Attorneys

THE COLUMBIA PLANOGRAPH CO., WASHINGTON, D. C.

UNITED STATES PATENT OFFICE.

JOHN E. HOY AND ROLAND P. PLACE, OF DETROIT, MICHIGAN.

DIRT-PROOF BEARING.

1,314,748.        Specification of Letters Patent.        Patented Sept. 2, 1919.

Application filed March 7, 1918, Serial No. 220,976. Renewed May 16, 1919. Serial No. 297,561.

*To all whom it may concern:*

Be it known that we, JOHN E. HOY and ROLAND P. PLACE, citizens of the United States, and residing at Detroit, county of Wayne, and State of Michigan, have invented a new and Improved Dirt-Proof Bearing, of which the following is a specification.

The present invention has reference to a bearing construction, and in the embodiment shown is applied to a grinding wheel dresser which, aside from the bearing and lubricating features, forms the subject matter of our application for United States Letters Patent Serial Number 220975 filed Mar. 7, 1918.

The main object is to form an efficient and inexpensive bearing capable of excluding particles of emery dust or other foreign matter from the bearing surfaces. Another object is to provide a bearing wherein the compressible packing material is relieved from contact with the end faces of the rotatable element, thus eliminating the tendency to tear the packing apart which is responsible for the short life thereof in ordinary constructions.

In attaining these and other objects the nature of which will appear later, the invention consists in a non-rotatable metal-faced packing interposed between the end face of the rotatable element and an adjacent face of the spindle or shaft whereon the element turns. It further consists in a bushing interposed between the spindle or shaft and the rotatable element and non-rotatable in respect to the former, together with a compressible metal faced packing held from rotation by the bushing and bearing on an enveloping portion of the rotatable member to form a tight seal. It also consists in a non-rotatable slotted bushing receiving a projection on a washer whereby the face of the packing is protected and serving to prevent rotation of the washer. Again, it consists in a pair of non-rotatable interposed washers seated in the end of the rotatable member and having between them a compressible felt-like material which may be pressed outwardly into sealing relation with the adjacent inner surface of the rotatable member. It further consists in the details of construction shown, described and claimed.

Figure 1:
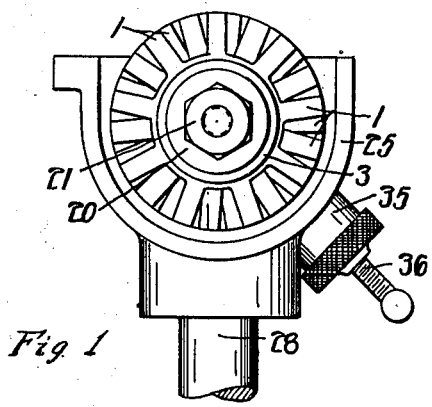
Figure 2:
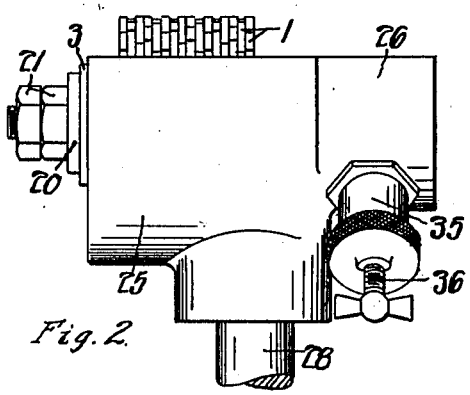
Figure 3:
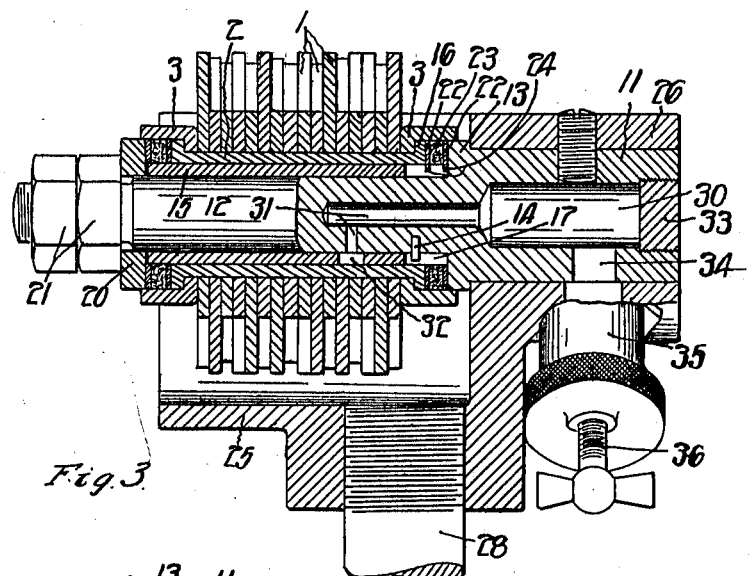
Figure 4:
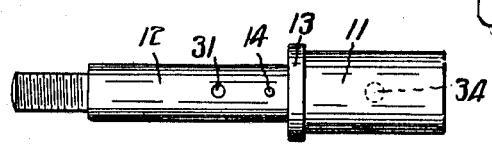
Figure 7:
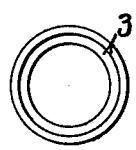
Figure 6:
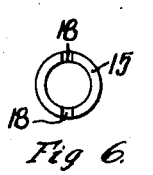
Figure 5:
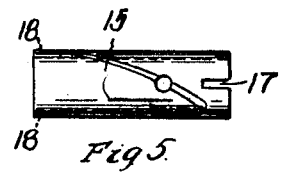
Figure 8:

In the drawings, Figures 1 and 2 are respectively an end view and a side view of the tool. Fig. 3 is a central longitudinal section corresponding to Fig. 2. Fig. 4 is a side view of the spindle. Figs. 5 and 6 are, respectively, a side view and an end of the bushing. Fig. 7 is an end view of a housing element whereby the sealing means is inclosed. Fig. 8 is a side view of one of the washers of the sealing means.

The cutter or abrading wheel, which constitutes the working element of the device shown, includes a series of thin toothed metal disks 1 arranged end to end on a metal spool or tube 2 the ends of the latter of which are received in cup-shaped housing members 3. By pressing the extreme ends of the tube over into the cups to form flanges 16, the outer faces of which are perpendicular to the axis of the cutter, the disks, the spool and the housing members are secured firmly together and are constrained to turn as a unit. Various other rotatable elements may be substituted therefor, that is, the bearing features hereinafter described are not limited to use in connection with a grinding wheel dresser but are of general application.

In the embodiment of the invention shown, the rotatable element is mounted on a spindle which includes an end portion 11 and a body portion 12 between which an annular shoulder 13 is formed, this shoulder being of less diameter than the internal diameter of the adjacent member 3; and the portion 12 has a pin 14 projecting therefrom near the shoulder. Surrounding the portion 12 is a tubular bushing 15 (Fig. 5) the ends of which are slotted at 17 and 18, one pair of slots preferably being in a plane at right angles to the plane of the other pair, and it will be seen (Fig. 3) that the pin is received in one of the slots 17, thus holding the bushing from turning. The bushing is retained by the washer 20 and the nuts 21.

Were no means provided to prevent it, the fine grains of material abraded from the grinding wheel, or such other foreign matter as might be present, would get into the joint between the rotatable member and the bushing and cut out the bearing. Ordinary packing, such as felt, might be inserted into the cup shaped elements 3 or their equivalent, but the friction of the flanges 16 thereon would soon tear the material to pieces. It is therefore preferred to use at each end a pair of thin metal washers 22 between which the felt or other relatively soft compressible material 23 is received. These washers each include an inwardly extending projection 24 (Fig. 8) those on the end nearest the shoulder being received in the slot 17 other than that into which the pin projects. At the opposite end the projections may be received in either one or the other or both of the slots 18, and it is evident that one of the slots 18 might be omitted. It is also evident that a somewhat similar action, in so far as protecting the packing is concerned, would take place were the projections 24 omitted from those washers which are farthest from the flanges 16, but the latter construction is not desirable since the washers referred to might then be carried around by the housing members 3. When all the washers are held from rotation, either as shown or in an equivalent manner, relative movement takes place along the faces of the flanges 16, and the packing is forced outwardly into close sealing relation to the inner surfaces of the cups 3 as the nuts 21 are tightened. A slight clearance is provided between the washer 20 and the bushing to allow for adjustment.

In the wheel dressing tool shown, the end portion 11 of the spindle is pressed into a bore in the end wall 26 of a housing 25, and the latter is carried in a tool post (not shown), or in the hand, by means of the handle 28. However, it will be understood that the invention is not limited to a construction in which the spindle or shaft is supported from one end only.

In order to insure proper lubrication and to further prevent the entrance of emery dust or other foreign material into the bearings, the spindle is bored out to form a chamber 30 that communicates with the inner surface of the cutter through the passages 31 and 32. The outer end of the chamber is provided with a screw plug 33. Lubricating fluid is supplied to the chamber through a lateral passage 34 from an ordinary grease cup 35 which is threaded into the end wall of the housing. When the compression screw 36 of the cup is turned, sufficient pressure is applied to the fluid to cause it to tend to work out between the packing and the inner surfaces of the elements 3 thus preventing the entrance of any particles of foreign matter that may collect around the end of said elements.

The details of construction are subject to considerable variation otherwise than as stated and we do not wish, therefore, to be limited except as indicated by the claims.

We claim:—

1. In a dirt proof bearing, a shaft having a shoulder, a member rotatable on the shaft, a longitudinally slidable washer interposed between the member and the shoulder and secured against rotating in respect to the shaft, a packing of compressible flexible material interposed between the washer and the shoulder, said rotatable member overlapping the washer and the packing and fitting closely to the latter on the outer surface thereof.

2. In a dirt proof bearing, a shaft, a bushing secured against rotation on the shaft, a member rotatable on the bushing, a metal washer surrounding the bushing and interposed between the rotatable member and the shaft, said washer being slidable along the bushing but non-rotatable in respect thereto, a packing of soft flexible material interposed between the washer and the shaft, said rotatable member overlapping the washer and the packing and forming a tight seal with the latter.

3. In a dirt proof bearing, a shaft, a member rotatable thereon, said member having an end face substantially perpendicular to the axis of the shaft and the shaft having a corresponding face adjacent said first named face, a packing of compressible material interposed between said faces, and a washer fixed against rotation and interposed between the packing and the end face of the rotatable member, the rotatable member overlapping the washer and the packing to form a tight joint.

4. In a dirt proof bearing, a shaft, a tubular member rotatable thereon and having an out-turned end flange presenting an annular end face, a cup-shaped member inclosing the outturned flange, a compressible packing element having a metal protecting washer on the side thereof next to the end face of the flange, said washer being slidable but non-rotatable on the shaft, the cup-shaped member overlapping the washer and the packing element to form therewith a sealed joint.

5. In a dirt proof bearing, a shaft, a member rotatable thereon, a washer of hard material slidable longitudinally of and secured against rotation in respect to the shaft and fitting against the rotatable member, a compressible packing for the washer on the side thereof most remote from the rotatable member, and means overlapping the washer and packing to form a tight joint for excluding dirt.

6. In a dirt proof bearing, a shaft, a tubular element rotatable in respect to the shaft, a metal washer interposed between an end surface of the element and the shaft, and fixed against rotation in respect to the shaft, a compressible packing for the washer, said rotatable element conforming to the outer surface of the washer and packing to form therewith a tight joint.

7. In a bearing construction, a shaft, a tubular member rotatable thereon, said member including an outwardly turned end flange, a cup-shaped bearing housing in which said flange is received, and a bearing within said housing and protected thereby.

8. In a bearing construction, a shaft, a tubular element rotatable about the shaft, a cup-shaped bearing housing in which the end of the tubular element is received, said element and said housing being rigid one with the other, and a bearing within said housing and protected thereby.

JOHN E. HOY.
ROLAND P. PLACE.